3,118,910
2-BROMOMETHYL-4-PHENYL-4-CHROMANCAR-
BOXYLIC ACIDS AND THEIR METHYL ESTERS
Harold Elmer Zaugg, Lake Forest, and Robert William
De Net, Waukegan, Ill., assignors to Abbott Laboratories, North Chicago, Ill., a corporation of Illinois
No Drawing. Filed Jan. 15, 1962, Ser. No. 166,372
5 Claims. (Cl. 260—345.2)

This invention is concerned with new chemical compounds of the formula

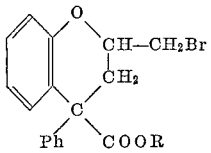

and a method for their preparation. In this and succeeding formulas, Ph represents phenyl and R is hydrogen or methyl. The compounds wherein R is methyl are useful as intermediates for the preparation of the compounds wherein R is hydrogen. In such use, either methyl cis or trans 2-bromomethyl-4-phenyl-4-chromancarboxylate is hydrolyzed by refluxing the same with a mixture of glacial acetic acid and aqueous hydrobromic acid as described hereinafter. The resulting cis and trans 2-bromomethyl-4-phenyl-4-chromancarboxylic acids are useful as precursors for the production of synthetic penicillins which are resistant to degradation by penicillinase. It is well known that penicillin G and V are attacked by the enzyme penicillinase and quickly lose their antibacterial activity. However, penicillins produced by the reaction of 6-aminopenicillanic acid and the chlorides of either cis or trans 2-bromomethyl-4-phenyl-4-chromancarboxylic acid are not so degraded and remain active against the Staphylococcus organisms which produce the penicillinase enzyme.

The compounds wherein R is methyl are prepared by the reaction at room temperature of equimolecular proportions of an alkali metal methoxide (preferably sodium) and either diastereoisomer of 3-(2'3'-dibromopropyl)-3-phenyl-2-benzofuranone in an inert solvent such as methanol. Upon completion of the reaction, the desired product is isolated by cooling the reaction mixture followed by filtration and subsequent purification by crystallization from a suitable solvent.

The compounds wherein R is hydrogen are prepared by refluxing a mixture of either the cis or trans isomer of methyl 2-bromomethyl-4-phenyl-4-chromancarboxylate in glacial acetic acid and aqueous hydrobromic acid. When the reaction is complete, the solvent is removed, the residue extracted with aqueous alkali and thereafter acidified to obtain the desired products as crystalline solids.

The following examples illustrate the invention and are not to be construed as limiting.

EXAMPLE 1

Methyl Cis-2-Bromomethyl-4-Phenyl-4-Chromancarboxylate

To a stirred solution of sodium methoxide prepared from sodium (9.5 g., 0.415 mole) in one liter of dry methanol was added in one portion at room temperature 170 g. (0.415 mole) of the 3-(2',3'-dibromopropyl)-3-phenyl-2-benzofuranone of M.P. 99°–101° C. After stirring for one hour, solution was virtually complete and product began to precipitate. The mixture was stirred at room temperature overnight, cooled in ice for several hours and the product collected by filtration. After recrystallization from methanol, the product melted at 107°–108° C. and upon analysis was found to contain 22.08% bromine compared to the calculated value of 22.12% bromine.

EXAMPLE 2

Methyl Trans-2-Bromomethyl-4-Phenyl-4-Chromancarboxylate

This compound was obtained by substituting the 3-(2',3'-dibromopropyl)-3-phenyl-2-benzofuranone of M.P. 137°–138° C. in the process described in Example 1. It melted at 111°–112° C. and contained 21.99% bromine compared to the theoretical value of 22.12% bromine.

EXAMPLE 3

Cis-2-Bromomethyl-4-Phenyl-4-Chromancarboxylic Acid

A solution of 5 g. (0.0138 mole) of methyl cis-2-bromo-methyl-4-phenyl-4-chromancarboxylate in 60 ml. of glacial acetic acid containing 15 ml. of 48% aqueous hydrobromic acid was refluxed overnight. Removal of the solvent by distillation followed by extraction of the residue with aqueous sodium bicarbonate, filtration from insoluble material and acidification gave the desired product which after recrystallization from a benzene-hexane mixture melted at 150°–151° C. and contained 23.25% bromine compared to the calculated value of 23.02% bromine.

EXAMPLE 4

Trans-2-Bromomethyl-4-Phenyl-4-Chromancarboxylic Acid

By hydrolyzing methyl trans-2-bromomethyl-4-phenyl-4-chromancarboxylate in the same manner as that described in Example 3, the desired product was obtained. M.P.=217°–218° C. after recrystallization from methanol. Br (found)=22.56%; Br (calc'd.)=23.02%.

The two diastereoisomeric 3-(2',3'-dibromopropyl)-3-phenyl-2-benzofuranones employed as starting materials in the present invention can be readily prepared as follows: To a cooled, stirred solution of 233 g. (0.93 mole) of 3-allyl-3-phenyl-2-benzofuranone prepared as described in Berichte, 57, 2040 (1924), in one liter of chloroform is added dropwise over an eight hour period a solution of 149 g. (0.93 mole) of bromine in 200 ml. of chloroform at a temperature of 0°–5° C. The chloroform is then removed by distillation and the residue fractionally crystallized from absolute alcohol to obtain one isomer melting at 99°–101° C. and the other isomer melting at 137°–138° C.

What is claimed is:
1. A compound of the formula

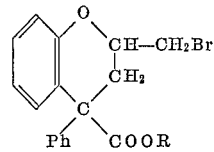

wherein Ph is phenyl and R is selected from the group consisting of hydrogen and methyl.
2. Methyl cis-2-bromomethyl-4-phenyl-4-chromancarboxylate.
3. Methyl trans-2-bromomethyl-4-phenyl-4-chromancarboxylate.
4. Cis-2-bromomethyl-4-phenyl-4-chromancarboxylic acid.
5. Trans-2-bromomethyl-4-phenyl-4-chromancarboxylic acid.

References Cited in the file of this patent
Fieser et al.: Advanced Organic Chemistry, pages 372–374, Reinhold Publishing Corp., New York (1961). Q.D. 251 F5a.